Figure 1:
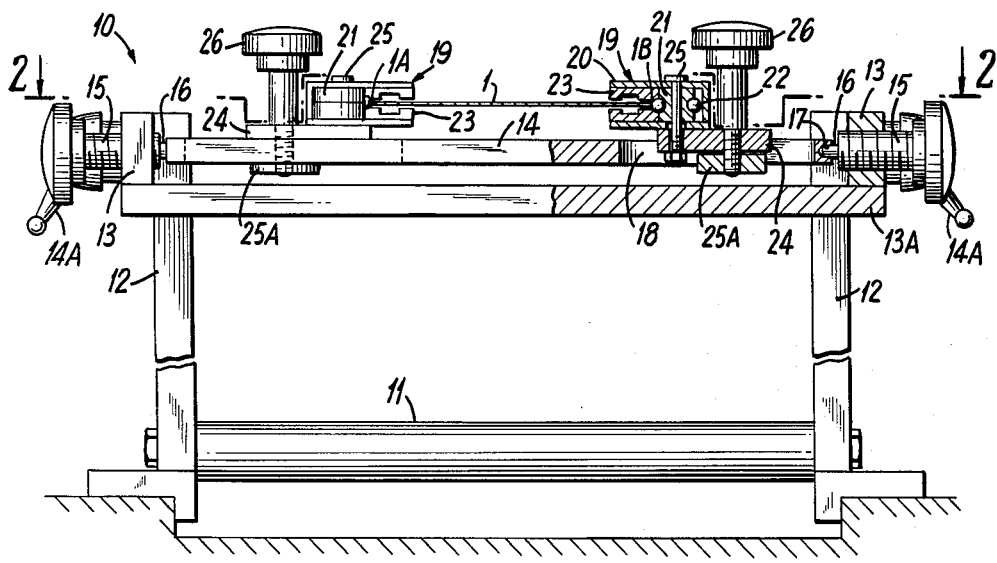

Jan. 28, 1964    G. LEHNERT    3,119,534
METHOD AND MEANS FOR GUIDING MOVING THIN METAL STRIPS
Filed May 17, 1962

INVENTOR.
GUNTHER LEHNERT
BY
ATTORNEY.

United States Patent Office 3,119,534
Patented Jan. 28, 1964

3,119,534
METHOD AND MEANS FOR GUIDING MOVING
THIN METAL STRIPS
Gunther Lehnert, Hannover-Bothfeld, Germany, assignor to Hackethal Draht- und Kabel-Werke A.G., Hannover, Germany, a corporation of Germany
Filed May 17, 1962, Ser. No. 195,600
Claims priority, application Germany May 17, 1961
8 Claims. (Cl. 226—1)

This invention relates to method and means for guiding the movement of thin metal strips of steel or other metals, and more particularly concerns guiding such strips in a longitudinal path as the same is progressively converted to tubular form with the side edges thereof brought together to form a seam which is retained by welding.

In such movement of the thin metal strip, it is vital that the strip move in a determined longitudinal path at all times with its longitudinal axis coincident with the longitudinal axis of the transporting device so that the side edges of the strip are brought into precise relationship relative to the fixed welding device which forms the seam in the tubular member. Any deviation in the movement of the strip laterally thereof will affect the formation of the welded seam adversely.

While various means have been proposed to accurately guide such moving thin metal strips to insure optimum welded seams, including sensing elements on the welding electrode which is arranged for movement in response to deviations in the position of the strip edges at the welding station; this arrangement has proved to be totally effective as the welding arc is unstable with a resultant arc flutter which gives rise to fire cracks and heat checks in the welded seam and producing a non-uniform weldment.

Also, it has been proposed to arrange the forming rollers which progressively convert the moving strip into tubular form, in a manner to minimize lateral movement of the strip. Special inclined guide rollers have been used for the purpose. While such expedients are useful in connection with soft metal strips, they are ineffective in connection with metal strips having a degree of springiness or resilience, such as steel or the like.

Accordingly, an object of this invention is to provide an improved method and means for guiding a moving metal strip which is progressively converted to tubular form as it approaches a welding station where the joint between the edges thereof is continuously welded; the moving strip being held to a fixed path so that the edges thereof are in precise relation to each other at all times when the same reach the welding station.

In accordance with the instant invention, guide means is provided in advance of the usual forming rollers; such guide means being effective to engage the side edges of the moving metal strip with minimum contact and friction, yet capable of positively holding the moving strip to its determined longitudinal path.

Figure 2:
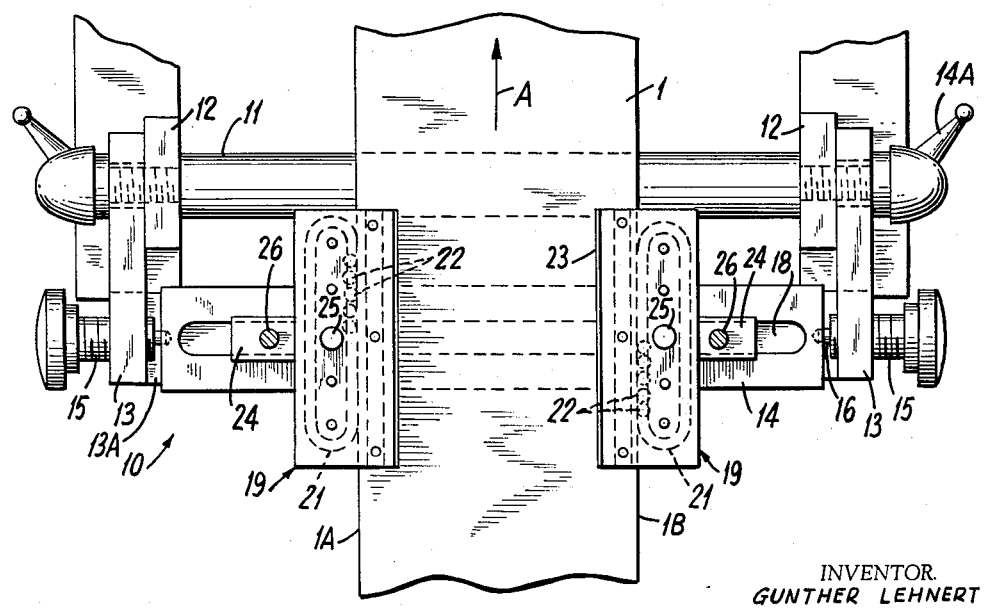

In the drawing,

FIG. 1 is an end elevational view of a device embodying the invention, with parts in section; and FIG. 2 is a top view of the device taken along lines 2—2 of FIG. 1.

As shown in FIGS. 1 and 2, a thin metal strip 1 is being moved in a determined longitudinal path, in a direction indicated by arrow A, through conventional transport means, not shown.

Edge guide means generally indicated at 10, engages the opposite side edges 1A, 1B of the moving strip 1 to prevent lateral deviations in the movement thereof. Guide means 10 comprises an upstanding U shaped support including a cross member 11 and uprights 12.

A pair of oppositely disposed, similar guide assemblies G are adjustably mounted on uprights 12. Such assemblies include lever members 13 pivoted on the uprights 12 by locking bolts 14A which may be tightened to lock the levers relative to the uprights. Lever members 13 are interconnected at their outer ends by a cross member 13A.

A horizontally disposed guide gib member 14 is mounted between the ends of lever members 13 for adjusted pivotal movement about a horizontal axis, as defined by horizontally aligned cap screws 15 threaded into said lever members, said screws having reduced end portions 16 received in recesses 17 formed in the ends of member 14. Gib member 14 is formed with a pair of longitudinally extending slots 18 at the opposite ends thereof, said slots being in longitudinal alignment.

A pair of edge guide means, generally indicated at 19 are adjustably mounted in gib slots 18. Guide means 19 comprises a channel shaped frame 20; said frames being disposed on their sides with their open ends in opposed relation. In each frame 20 there is located an endless ball bearing race member 21 disposed adjacent the web portion of the frame and carrying ball bearings 22.

Also mounted in each frame member 20 are a pair of opposed plates 23 forming a slot therebetween for receiving the lateral edge portions of strip 1. Frames 20 are mounted on slide blocks 24 by means of vertical bolts 25 to allow for adjustment thereof about vertical axes. Blocks 24 are slidably mounted in gib slots 18 by means of retainer plates 25a and cap screws 26 which pass through the blocks and are threaded into openings in said retainer plates.

It will be apparent that the guide assemblies G may be adjusted to desired positions in relation to the moving strip 1 to bring the edges 1A, 1B thereof into contact with the ball bearings 22. As the strip 1 moves in direction A, the strip will be restrained against lateral movements, yet the confining action will be in terms of a rolling contact with minimized friction.

Furthermore, strip edges 1A, 1B are engaged at spaced points by ball bearings 22, thus avoiding possible damage to the strip edges and thereby preventing imperfect welded seam portions. Thus, the strip edges 1A, 1B will be brought together by the forming rollers, not shown, when said strip 1 is converted to tubular form, in precise relation to the welding electrode, not shown, further insuring uniform welded seams of high quality.

As various changes might be made in the embodiment of the invention herein disclosed without departing from the spirit thereof, it is understood that all matter herein shown or described shall not be deemed limiting except as set forth in the appended claims.

What is claimed is:

1. A method of guiding a thin metal strip moving in a determined longitudinal path comprising frictionally engaging the opposite side edges of said strip with rollable spherical members arranged in a fixed longitudinal path on either side of said moving strip and retaining said moving strip against movement in directions at right angles to the plane of movement of said strip while the strip edges are engaged by said rollable spherical members.

2. A method of guiding a thin metal strip moving in a determined longitudinal path comprising confining marginal edge portions of said moving strip against vertical displacement while confining the side edges of said moving strip against lateral movement by frictionally engaging spaced points along said moving strip with rollable spherical elements movable along the edge portions of said moving strip.

3. Means for guiding a thin metal strip moving in a determined longitudinal path comprising a pair of guide assemblies respectively disposed along opposite edges of the moving strip, each assembly comprising frame means slotted to receive marginal edge portions of the moving strip and to retain said moving strip against displacement at right angles to the plane of said path, and ball bearing means on said frame means arranged along the inner edge of the slotted portion of said frame means for rolling contact with the edges of said moving strip.

4. Means as in claim 3, wherein said ball bearing means comprises an endless race means for carrying ball bearings, said race means including a longitudinally extending portion for location adjacent the edge portion of said strip.

5. Means as in claim 3, and including means for adjusting the positions of said guide assemblies relative to each other.

6. Means as in claim 3, wherein each guide assembly comprises a U shaped frame member, said members being arranged with their open ends in opposed, horizontal relation, ballbearing race means mounted within the inner portions of said frame members, said race means being endless and with parallel, longitudinally extending portions extending parallel to the open outer edges of said frame members, ball bearings in said race means for movement therein, said frame portions including outer opposed portions for receiving and supporting marginal edge portions of said moving strip.

7. Means as in claim 3, and further including means for adjustably mounting said guide assemblies, said mounting means comprising a slotted horizontally disposed gib member, slide blocks on said gib member mounted in the slots thereof for movement towards and away from each other, means for locking said slide blocks in place on said gib member, means for mounting said frame means on said slide blocks, a support, and pivot means for adjustably mounting said gib member for adjusted pivotal movement about a horizontal axis on said support.

8. Means as in claim 7 wherein said pivot means includes lever means pivotally mounted at one end thereof on said support, and pivot elements on the other ends of said lever means for engaging opposite end portions of said gib member.

References Cited in the file of this patent

UNITED STATES PATENTS

| | | |
|---|---|---|
| 1,566,441 | Smothers | Dec. 22, 1925 |
| 2,303,533 | Ferm | Dec. 1, 1942 |
| 2,402,546 | Gaykowski | June 25, 1946 |

FOREIGN PATENTS

| | | |
|---|---|---|
| 712,282 | Germany | Oct. 15, 1941 |